United States Patent
Wegmann

(10) Patent No.: US 7,088,458 B1
(45) Date of Patent: Aug. 8, 2006

(54) APPARATUS AND METHOD FOR MEASURING AN OPTICAL IMAGING SYSTEM, AND DETECTOR UNIT

(75) Inventor: Ulrich Wegmann, Koenigsbronn (DE)

(73) Assignee: Carl Zeiss SMT AG, Oberkochen (DE)

( * ) Notice: Subject to any disclaimer, the term of this patent is extended or adjusted under 35 U.S.C. 154(b) by 282 days.

(21) Appl. No.: 10/743,107

(22) Filed: Dec. 23, 2003

Related U.S. Application Data

(60) Provisional application No. 60/435,267, filed on Dec. 23, 2002.

(51) Int. Cl.
 G01B 9/02 (2006.01)
 G01B 9/00 (2006.01)

(52) U.S. Cl. .................. 356/515; 356/521; 356/124
(58) Field of Classification Search ................. 356/124, 356/489, 495, 515, 512, 521
 See application file for complete search history.

(56) References Cited

U.S. PATENT DOCUMENTS

| | | | | |
|---|---|---|---|---|
| 5,355,210 A | * | 10/1994 | Keren et al. ................. | 356/515 |
| 5,835,218 A | * | 11/1998 | Harding ....................... | 356/521 |
| 2002/0001088 A1 | * | 1/2002 | Wegmann et al. ........... | 356/521 |
| 2004/0174533 A1 | * | 9/2004 | Nakauchi .................... | 356/515 |
| 2005/0122506 A1 | * | 6/2005 | Wegmann et al. ........... | 356/124 |
| 2006/0001861 A1 | * | 1/2006 | Wegmann .................... | 356/124 |
| 2006/0012799 A1 | * | 1/2006 | Wegmann .................... | 356/515 |

FOREIGN PATENT DOCUMENTS

DE 101 09 929 A1 11/2001

* cited by examiner

*Primary Examiner*—Hwa (Andrew) Lee
*Assistant Examiner*—Patrick Connolly
(74) *Attorney, Agent, or Firm*—Sughrue Mion, PLLC

(57) ABSTRACT

Apparatus and method for measuring an optical imaging system, and detector unit. The measuring apparatus contains an arrangement for combining wavefront and distortion measurements. For this purpose, respectively associated interferometry and Moiré structures can be introduced on the object side and image side. The detector unit contains a fiber plate and/or a flexible image conductor with a curved entry surface or with at least two different entry surfaces, which are offset axially or inclined spatially with respect to each other, or with an axially movable entry surface. By way of suitable wavefront acquisition in various lateral positions of object and/or image structure, a topographic calibration of the object or image structure can be carried out. Furthermore, by way of a Moiré technique, the lateral displacement travel in phase-shifting steps for the wavefront acquisition and, by way of point diffraction interferometry, the axial relative position of object and image structure can be determined highly accurately. The apparatus and method are used, in particular, for measuring lenses in microlithography installations.

14 Claims, 11 Drawing Sheets

APPARATUS AND METHOD FOR MEASURING AN OPTICAL IMAGING SYSTEM, AND DETECTOR UNIT

The following disclosure is based on U.S. Patent Application No. 60/435,267, filed on Dec. 23, 2002, which is incorporated into this application by reference.

FIELD OF AND BACKGROUND OF THE INVENTION

The invention relates to an apparatus and a method for measuring an optical imaging system and to a detector unit which, in particular, can be used for such an apparatus.

Methods and apparatuses of this type are used for determining the imaging quality or image errors of optical imaging systems. The invention relates in particular to methods and apparatuses with which image errors of highly accurate imaging systems, such as are used, for example, in micro-lithography systems for structuring semiconductor devices, can be determined interferometrically with the greatest precision. For this purpose, what is known as the wavefront/image shell measurement by means of shearing interferometry, see for example German laid-open specification DE 101 09 929 A1, and by means of point diffraction interferometry are known as one technique. If, for these interferometric measurements, the same radiation is used as is used by the imaging system in its normal operation, it being possible for the measuring apparatus to be integrated in one structural unit with the imaging system, this is also referred to as an operational interferometer ("Betriebsinterferometer, BIF"). On the other hand, Moiré techniques are usual for distortion measurement.

In the case of the conventional Moiré measuring technique, the entire object field is illuminated and a Moiré object grid structure is introduced into the object plane of the imaging system to be measured and imaged by the latter into the image plane, into which a corresponding Moiré image grid structure is introduced. The Moiré image produced in the image plane is imaged via further imaging optics onto a detector plane, for example of a detector camera. In the case of conventional wavefront measurement by means of shearing interferometry or point diffraction interferometry, on the other hand, a coherence-forming object wavefront-producing structure or a pinhole structure is introduced into the object plane and imaged onto the image plane, in which there is a shearing diffraction grating or a further pin-hole structure. Subsequent imaging optics are arranged in such a way that their object plane lies in the image plane of the imaging system to be measured, so that the exit pupil of the imaging system to be measured is imaged onto the detector plane, for example of a detector camera. On account of these opposite functional principles, hitherto in each case separate measuring apparatuses have been used for wavefront measurement by means of shearing or point diffraction interferometry, on the one hand, and for distortion measurement by means of Moiré methods, on the other hand.

OBJECTS OF THE INVENTION

The invention is based, as a technical problem, on providing an apparatus and a method which, in a simplified manner, permit both wavefront/image shell measurement by means of interferometry and distortion measurement by means of a Moiré technique for the highly accurate measurement of optical imaging systems. Furthermore, the invention is based on the provision of a detector unit which, inter alia, is suitable for such an intended application.

SUMMARY OF THE INVENTION

The invention solves this problem by providing an apparatus and a method which comprise a combined wavefront and distortion measurement. The associated arrangement includes, on the object side, the simultaneous or alternative introduction of an interferometry object structure for wavefront generation from illuminating light and a Moiré object structure for Moiré pattern generation. Corresponding to this, an interferometry image structure matched to the interferometry object structure and a Moiré image structure matched to the Moiré object structure can be introduced on the image side. Furthermore, the apparatus comprises a special detector unit which includes a first detector surface for the spatially resolving acquisition of wavefront information for the interferometric measurement and a second detector surface, for example offset axially with respect to this, for the spatially resolving acquisition of Moiré information for the distortion measurement. Consequently, with this combined arrangement, both wavefront measurement by means of interferometry, in particular shearing interferometry or point diffraction interferometry, and distortion measurement by means of a Moiré technique for the highly accurate measurement of an optical imaging system by means of a single apparatus are possible without the optical imaging system having to be moved into two separate measuring systems for this purpose.

In a development of the invention, the object structures and/or the image structures are implemented by line-grid, cross-grid, checkerboard-grid and/or point-diffraction interferometry structures lying next to each other on an appropriate object structure unit or image structure unit. If required, different interferometry and/or Moiré structure regions with different structure periodicities can be provided. Each shearing interferometry structure region and/or Moiré structure region on the object side can be assigned their own illumination focusing optics and/or diffusor plate region.

The invention additionally comprises a detector unit which has a fiber plate and/or a flexible image conductor bundle, whose entry side comprises at least two different entry surfaces and/or a curved entry surface and/or an axially movable entry surface. Detector units with a curved entry surface can be used in particular to compensate for focal deviations in the image field of a preceding optical imaging system. In this case, inter alia, any desired aspherical curvature is also possible. Detector units with entry surfaces lying relative to one another at different spatial angles are useful, for example, in applications in which an image is to be acquired from a plurality of different spatial directions. Detector units with axially offset entry surfaces or an axially movable entry surface are useful, for example, for uses in which a plurality of focal planes are needed for different or the same regions of the object field of an imaging system. This detector type is in particular also well-suited for the apparatus according to the invention for measuring optical imaging systems, since it is capable of providing two axially offset detector planes, one for the shearing interferometry and the other for the Moiré image acquisition, with a single entry surface.

If such a detector unit is used in the measuring apparatus according to the invention, the fiber plate can be set back axially in the shearing interferometry regions or cut out completely. In the latter case, the light used for wavefront acquisition falls directly on a spatially resolving sensor element arranged behind the fiber plate.

On its entry side, the detector unit can be provided with a frequency-converting fluorescent layer and/or with a diffusor structure which enlarges the acquisition spatial angle.

In a further advantageous refinement of the invention, the fiber plate or the image conductor bundle contains two parts which are located one above another and can be moved laterally relative to one another. This permits lateral relative movements between the image structure unit and the sensor element by means of displacing the two parts of the fiber plate or of the image conductor bundle relative to each other. In the measuring apparatus according to the invention, this can be used in particular for the phase shifting during the shearing interferometry measuring operation. Furthermore, in the measuring apparatus according to the invention, it may be advantageous to arrange image structure unit and sensor element such that they can move axially relative to each other.

In a further advantageous embodiment of the invention, there is a microobjective in the respective cut-out fiber plate region which is formed by the set-back or completely cut-out formation of the fiber plate in the regions for wavefront acquisition. Alternatively or additionally, the cut-out region can be filled with a higher refractive medium. Both reduce the space required per information channel for the shearing interferometry and permit an increased packing density.

In an advantageous embodiment of the invention, imaging optics are provided between the exit side of the fiber plate or the image conductor bundle and the spatially resolving sensor element. This is beneficial in particular for applications in which the sensor element should be arranged at a somewhat greater distance from the preceding system part.

In an advantageous refinement of the operating method according to the invention, the possibility is provided of topographic calibration of the object structure unit and/or the image structure unit by using wavefront acquisition by means of shearing interferometry.

In a further aspect of the invention, the operating method includes a Moiré measuring technique for the precise determination and, if appropriate, open-loop/closed-loop control of the lateral spatial displacement increments for the phase-shifting steps of the shearing interferometry measuring operation.

In a further advantageous aspect of the invention, a structure region with superimposed shearing interferometry and Moiré patterns is used, the measurement with the two measuring types being carried out alternately by means of axial displacement of the detector plane.

In a further refinement of the operating method, the relative axial position of object and image structure is acquired with the aid of point diffraction interferometry structures on the object side and image side and, if required, tracked or regulated.

BRIEF DESCRIPTION OF THE DRAWINGS

Advantageous embodiments of the invention are illustrated in the drawings and will be described below. In the drawings.

DETAILED DESCRIPTION OF THE PREFERRED EMBODIMENTS

Figure 1:
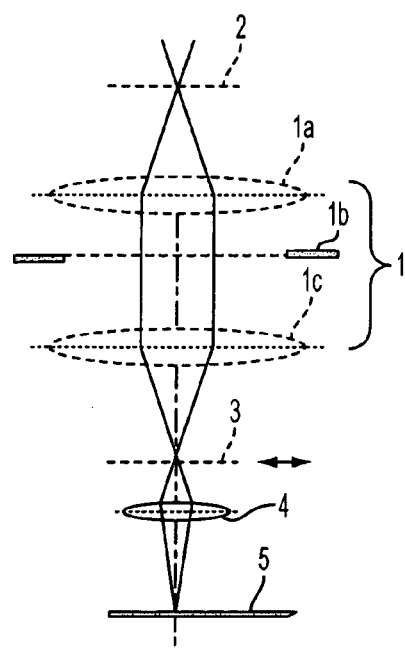
FIG. 1 shows a schematic side view of a conventional apparatus for Moiré distortion measurement.

For the purpose of understanding the invention, first of all the significant components of conventional systems for distortion measurement of optical imaging systems by means of Moiré structures and for the pupil-resolved determination of the imaging quality by means of shearing interferometry wavefront measurement will be discussed with reference to FIGS. 1 and 2. FIG. 1 shows a typical structure of an apparatus for distortion measurement by means of the Moiré technique. The optical imaging system to be measured, also referred to as the objective below, is represented in simplified form by a lens 1*a* on the object side, an objective pupil 1*b* and a lens 1*c* on the image side. A Moiré object structure unit 2, for example with a Moiré line-grid structure, is introduced into the object plane. The Moiré structure on the object side is imaged by the objective 1 onto the image plane, in which there is a laterally movable Moiré image structure unit 3 which has an appropriate Moiré image structure corresponding to the Moiré object structure, taking into account the imaging scale of the objective 1. The superimposition of the imaged Moiré object structure with the Moiré image structure in the image plane of the objective 1 is imaged onto a detector plane 5 by imaging optics connected downstream, represented schematically in FIG. 1 by a lens 4, it being possible for said detector plane 5 to be, for example, a CCD array of an image recording camera.

Figure 2:
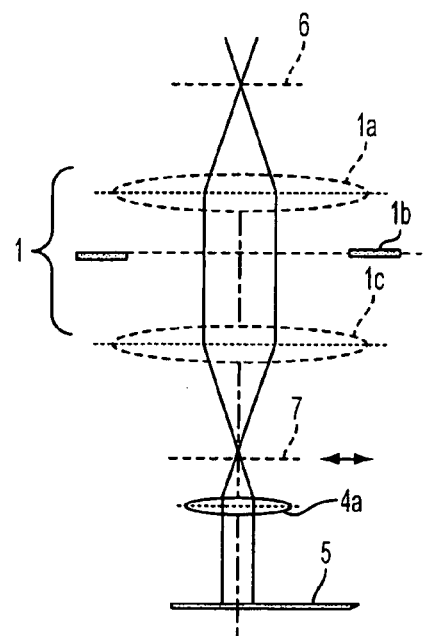
FIG. 2 shows a schematic side view of a conventional apparatus for wavefront acquisition by means of shearing interferometry.

FIG. 2 illustrates the typical structure of an apparatus for image error determination of the objective 1 by means of wavefront measurement by shearing interferometry. In this case, a shearing interferometry object structure unit 6 is introduced into the object plane of the objective 1, preferably in the form of a suitable coherence mask. An associated diffraction grating 7 is introduced into the image plane such that it can be moved laterally. Imaging optics 4*a* connected downstream are arranged in such a way that their object plane lies in the image plane of the objective 1 to be measured, so that they image its exit pupil onto the detector plane 5.

According to the invention, the two measuring techniques according to FIGS. 1 and 2 are combined in a single measuring apparatus. This is implemented in particular by using special object and image structure units and by means of a special construction of the detector unit.

Figure 3:
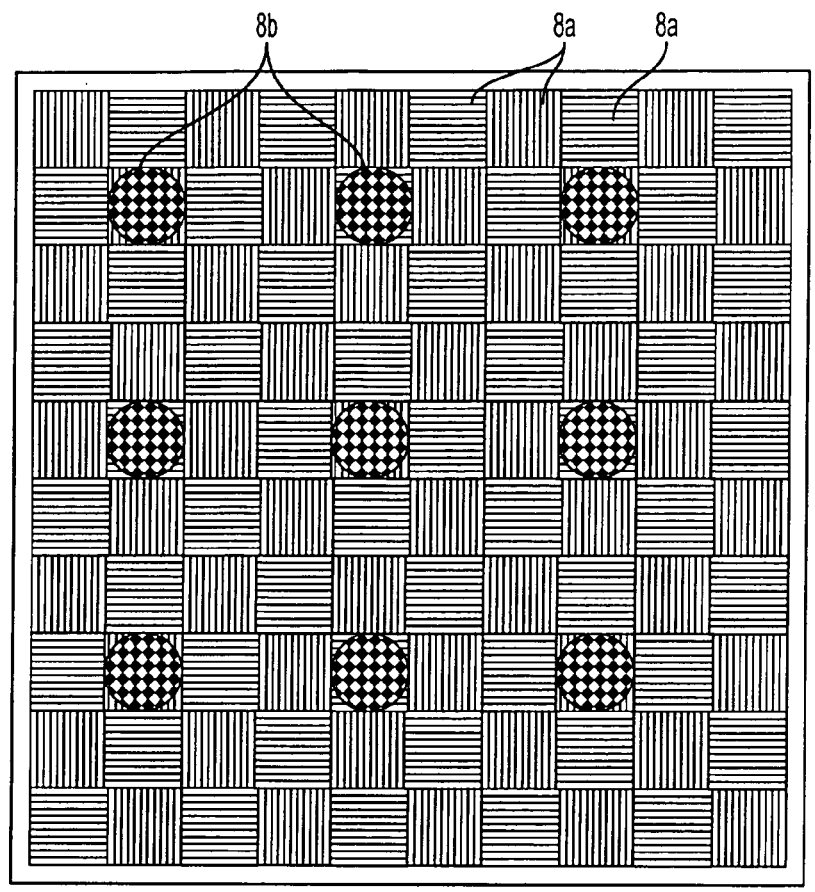
FIG. 3 shows a plan view of a combined Moiré and shearing interferometry grid structure unit for use as an object structure unit and image structure unit in an apparatus for combined wavefront and distortion measurement.

FIG. 3 shows a structure plate unit 8 which can be used for this intended application as an object structure unit and, while observing the imaging scale of the imaging system to be measured, can be inserted in an appropriately scaled form as an image structure unit. This structure plate unit 8 has a parquet line grid 8*a*, of which some fields at predefinable locations are replaced by a checkerboard-grid pattern 8*b*. The parquet line grid 8*a* is used in a known manner for Moiré distortion measurement. The checkerboard-grid pattern 8*b*, likewise known per se, serves as a coherence-forming structure, that is to say a coherence mask, on the object side and, on the image side, as a diffraction grating structure for the wavefront measurement by shearing interferometry. Alternatively, instead of the parquet line grid 8*a*, a simple Moiré line pattern or another conventional Moiré structure can be used. Use is preferably made of Moiré patterns which permit a measurement of the distortion components in both lateral plane directions, that is to say in the X and Y directions. In particular, cross grids or checkerboard grids can also be used as Moiré patterns. Consequently, it is also possible to use a structure unit which contains one or more structure regions, for example with a line-grid, cross-grid or checkerboard-grid pattern which functions or function both as a Moiré structure and as a shearing interferometry structure. In the case of the Moiré measurement, the detection plane to be evaluated lies in the image plane of the imaging system to be measured, in the case of wavefront acquisition, it is at a distance from this image plane. The detection can be carried out with a detector element that is arranged such that it can be moved axially, whose detection plane is moved into the image plane for the Moiré measurement and, for the shearing interferometry measurement, is moved axially rearward out of the image plane to a certain distance in order to acquire the image pupil plane of the test specimen.

Figure 4:
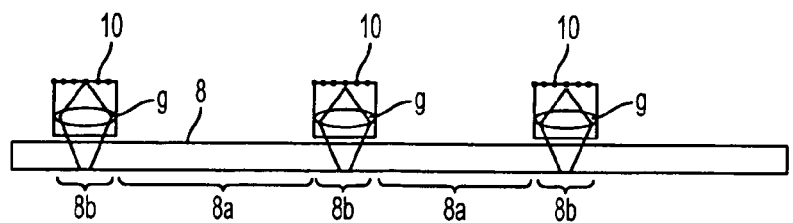
FIG. 4 shows a schematic side view of the grid structure unit of FIG. 3 with associated shearing interferometry illumination focusing optics.

On the object side, in order to illuminate the interferometry channels, that is to say regions of the object structure unit used for the shearing interferometry, in each case focusing optics 9 with associated diffusion plate 10 can be arranged, as shown in the example of FIG. 4. Conventional standard illumination, for example aerial illumination, is connected upstream. Alternatively, it is also possible for only the focusing optics or only the diffusion plate to be provided. In further alternative embodiments, focusing optics and/or a diffusion plate are/is correspondingly assigned to the Moiré structure regions.

As an alternative to using the combined structure plate unit of FIG. 3, it is possible to operate on the object side with a dedicated mask in each case, that is to say interchangeably with a normal distortion mask with Moiré structures for the Moiré distortion measurement and a coherence mask for the wavefront measurement, for example in the form of a multichannel mask or a simpler mask with associated diffusion plate.

Figure 5:
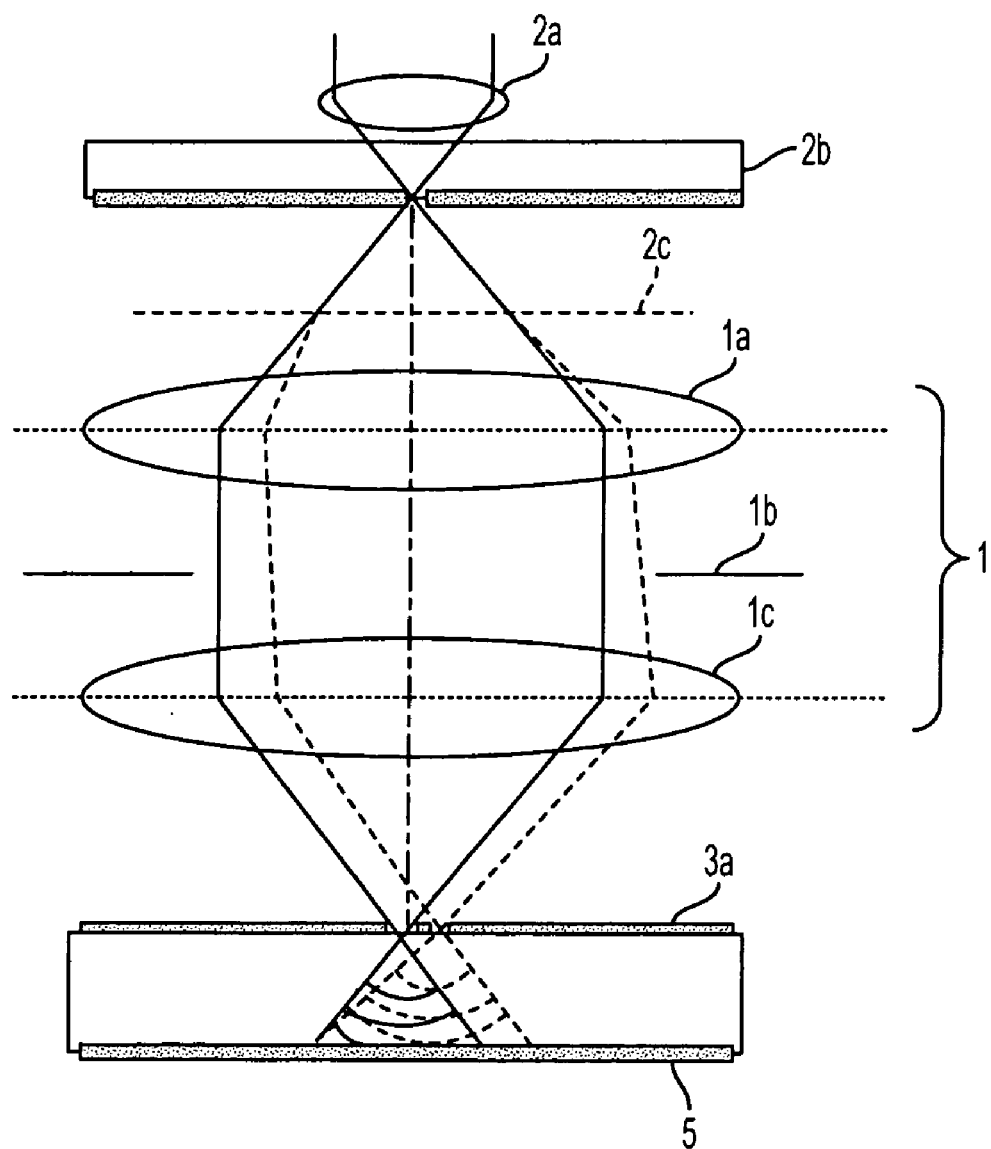
FIG. 5 shows a schematic side view of a conventional apparatus for measuring by means of point diffraction interferometry.

According to the invention, apart from the combination explained above of Moiré distortion measurement and shearing interferometry wavefront measurement, a combination of Moiré distortion measurement and wavefront measurement by means of point diffraction interferometry is possible, with or without an additional shearing interferometry wavefront measurement as required. FIG. 5 shows the typical construction of a measuring apparatus operating with point diffraction interferometry. A first pinhole mask 2*b* on the object side is connected downstream of illumination focusing optics 2*a*, preferably lies in the object plane of the test specimen 1 and has one or more pinholes, onto which the illuminating radiation is focused in order to generate a respective first spherical wave. Provided between this pinhole mask 2*b* and the test specimen 1 is a beam-splitting diffraction grating 2*c*, in order to generate a second spherical wave as a reference wave. The test specimen wave and the reference wave are indicated schematically by continuous and dashed lines, respectively. On the image side, a second pinhole mask 3*a* is arranged close to or in the image plane of the test specimen 1. It has at least one pinhole to diffract the reference wave and also a larger opening for the test specimen wave to pass through. The beam-splitting diffraction grating 2*c* can also be arranged on the image side between the test specimen 1 and the pinhole mask 3*a* on the image side. Behind the pinhole mask 3*a* on the image side, the test specimen wave then interferes with the reference wave on the detector plane 5. Phase shifting can be carried out by means of lateral movement of the diffraction grating 2*c*.

Figure 6:
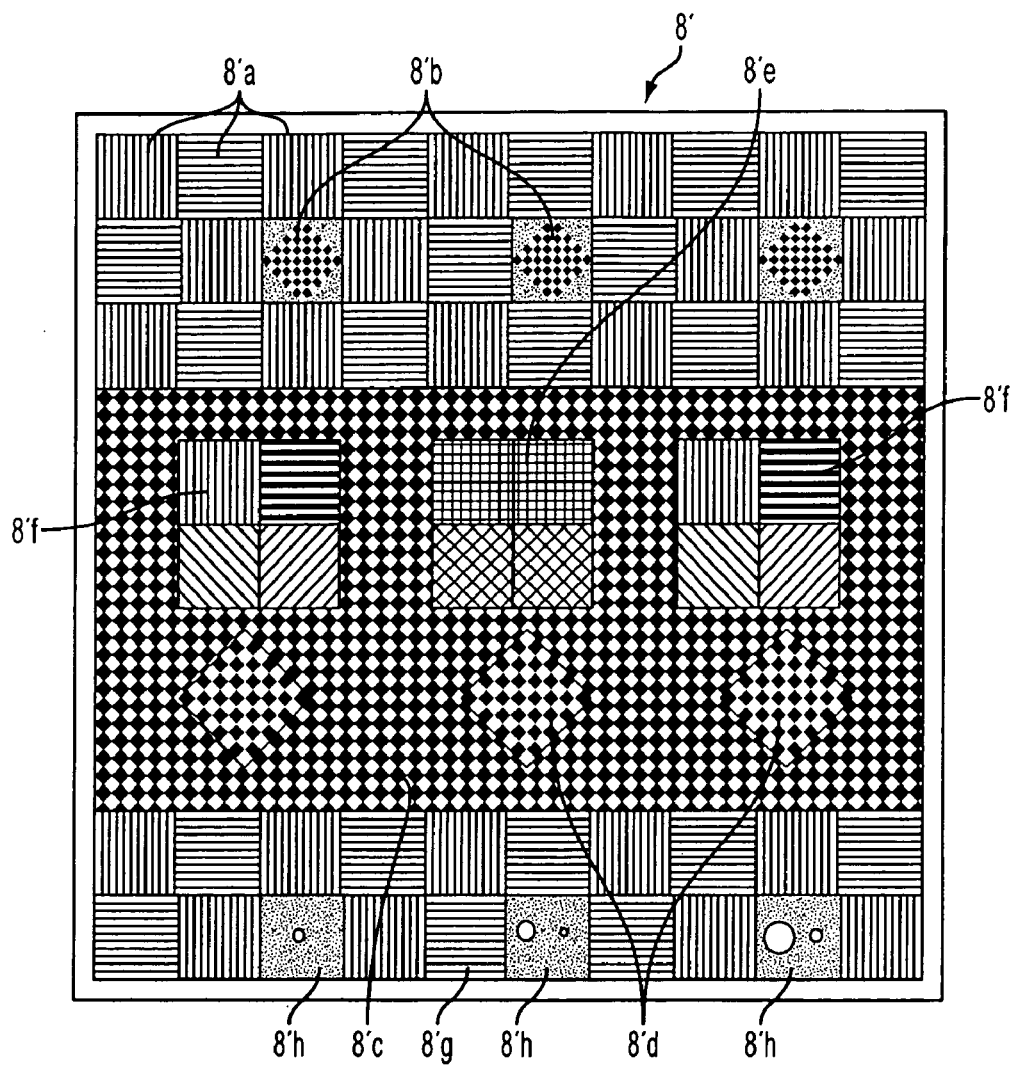
FIG. 6 shows a plan view of a structure unit which has combined Moiré, shearing interferometry, and point diffraction structures, for use as an object and image structure unit in an apparatus for combined wavefront/image shell and distortion measurement.

FIG. 6 shows a structure plate unit 8' which can be used for this application according to the invention of combined shearing interferometry measurement, point diffraction interferometry measurement and Moiré measurement as an object structure unit and image structure unit analogous to the structure plate unit 8 of FIG. 3. The structure plate unit 8' of FIG. 6 has in an upper third a parquet line grid 8'*a* for Moiré distortion measurement, some parquet fields being replaced by a first checkerboard-grid pattern 8'*b* for the shearing interferometry. In a central third, the structure plate unit 8' has a Moiré checkerboard grid 8'*c*, again subregions being replaced by shearing interferometry structures, specifically by three further, individual shearing interferometry checkerboard grids 8'*d*, by a shearing interferometry cross-grid pattern 8'*e* with four individual square cross-grid fields of different orientation and also two shearing interferometry line-grid fields 8'*f* each having four square line-grid fields of different orientation. In the lower third, again a parquet line grid 8'*g* is provided, three individual fields of the latter each being replaced by a point diffraction interferometry structure 8'*h*. The latter in each case contains a pinhole, in addition two openings of different size with a diameter considerably larger than the pin-hole diameter being introduced into two of these three pinhole fields. Pin-hole structures of this type are known per se for point diffraction interferometry and therefore do not require any further explanation.

With the structure plate unit 8' of FIG. 6, a Moiré distortion measurement can be combined with a wavefront/image shell measurement by means of shearing interferometry and point diffraction interferometry, specifically in one measuring procedure in a single measuring apparatus, in which this structure plate unit 8' is used as object and image structure unit. The associated procedure is likewise known per se for the individual measurement types, as are the relevant, suitable evaluation algorithms, so that it is not necessary to discuss this specifically here.

In further alternative embodiments of the invention, at least two different grid structures with different grid periodicities are used for the shearing interferometry measurement and/or the Moiré measurement, for which purpose correspondingly differently configured structure regions can be provided on a structure plate unit of the type of FIGS. 3 and 6. With regions of smaller grid periodicity, higher resolution can be achieved for specific pupil regions, while in the case of other regions, in which such a high resolution is not required, structures with a higher grid periodicity can be used, which are less sensitive to noise.

The measuring apparatus according to the invention is suitable in particular for integrated use in systems with highly accurate imaging optics, such as in stepper and scanner systems of microlithography installations for semiconductor structuring. Using such a measuring apparatus, all the relevant image errors/aberrations can be measured, such as distortion (Zernike coefficients Z2 and Z3, that is to say relative tilting of the wave-front in the full field), image field curvature (distribution of the Zernike coefficient Z4 over the image field) and the further, higher Zernike coefficients of the wavefronts (corresponding to the conventional evaluation of the wavefront measurement by means of shearing interferometry).

In particular for determining the distribution of the Zernike coefficient Z4 (focus) over the full field (image shell), correction of the Z4 measured values through possible topographic errors of the object structure unit and the image structure unit, that is to say their respective deviation from an ideal plane, is expedient. One possibility for this is to measure the surfaces of object and image structure unit in a manner known per se by means of a planar surface interferometer, preferably in the installed position. The data sets obtained can be used to calculate a correction data set, so that for each interferometer channel there is a correction value which can be used with the measured Z4 value to calculate a corrected Z4 value.

A further possibility is a special calibration method as one aspect of an operating method according to the invention of the measuring apparatus according to the invention, in which the presence of a periodic arrangement of wavefront channels in a preferably orthogonal grid is used. In the case of such an in-situ calibration of possible topographic errors, in a first measuring operation the wavefronts are recorded in an undisplaced grid position, that is to say in an undisplaced relative initial position of object structure unit and image structure unit. In a second measuring operation, for the purpose of topographic error calibration of the image structure unit, the wavefronts are recorded in a grid position in which the image structure unit is displaced laterally by one grid period with respect to the initial position, the grid spacings and therefore the displacement increments being coupled via the imaging scale of the objective to be measured. The lateral displacement can, for example, be carried out firstly in the X direction. The difference between the Z4 values from the two measurement operations is then calculated. The topographic values are then available as Z4 values in the form of the derivative in the X direction, so that the topographic profile looked for can be reconstructed by means of integration in the X direction.

The corresponding procedure is followed in the Y direction, that is to say the difference in the Z4 values between the undisplaced initial state and a position displaced by one grid in the Y direction is determined. The reconstruction of the entire topographic surface of the image structure unit can then be carried out in accordance with the conventional algorithms for phase reconstruction. For the measurement of the topography of the object structure unit, the same method is applied in an equivalent manner, only instead of the image structure unit, the object structure unit is displaced in each case by one grid in the X and Y direction. In order to increase the measurement accuracy, in addition a displacement in the opposite direction can be provided in each case. During the topographic reconstruction, the sign then has to be observed. Furthermore, if required, a displacement by more than one grid spacing is possible.

As mentioned above, the structure on the image structure unit corresponds to that on the object structure unit with appropriate scaling according to the imaging scale of the objective to be measured. Typical imaging grid periods for the parquet Moiré structure are of the order of magnitude of 0.5 μm to 1 μm, for checkerboard structures of the order of magnitude of 6 μm to 12 μm, depending on the application.

When point diffraction interferometry structures are used in the object and the image structure, as shown for example for the structure plate unit of FIG. 6, these can also be used to register the relative position of object and image structure in the axial direction by using the point diffraction interferogram and therefore to adjust or regulate it as required.

Figure 7:
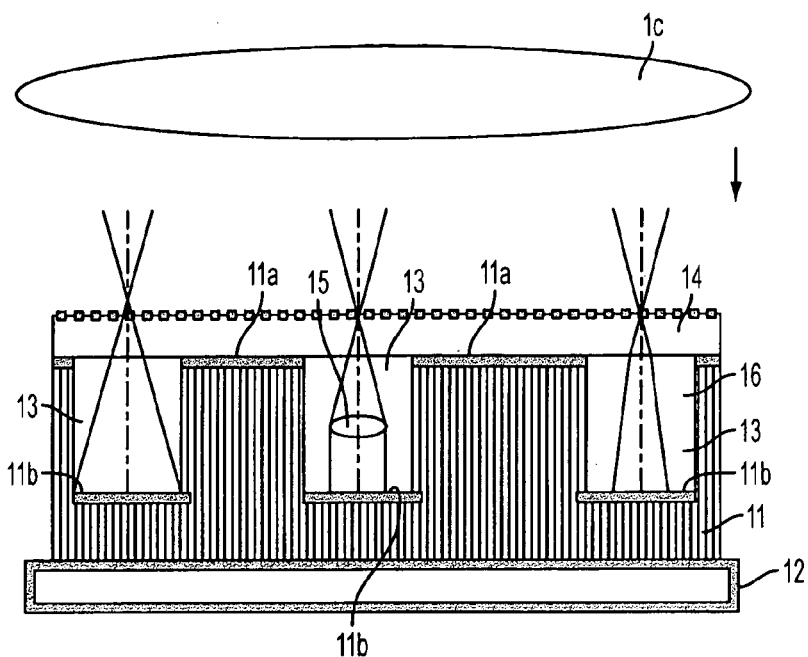
FIG. 7 shows a schematic side view of the part on the image side of a measuring apparatus with combined wavefront and distortion measurement using a fiber plate detector unit with three different beam guidance possibilities on the image side for the shearing interferometry regions.

For the purpose of detection for the measuring apparatus according to the invention, use can be made of a detector unit which is suitably matched to the object and image structures and has detection regions for the Moiré measurement and detection regions for the wavefront measurement of the shearing or point diffraction interferometry. Such a detection structure can be implemented, for example, by a multi-frequency detection grid structure whose regions for the Moiré measurement, on the one hand, and the wave-front acquisition, on the other hand, are assigned to the corresponding regions of an object grid structure via the imaging scale of the imaging system to be measured. FIG. 7 shows the construction of such a detector unit using a light-conducting fiber plate 11, whose flat exit side is followed by a spatially resolving sensor element 12, for example a CCD array of an image recording camera.

As can be seen from FIG. 7, the fiber plate 11 has on the entry side a first, front entry surface 11*a* and a second entry surface 11*b* which is set back axially with respect to this. The axially set-back, multi-part entry surface 11*b* is formed by appropriate cutouts 13 being introduced from the entry side down to a predefinable depth, which is typically in the region of a few millimeters. The individual regions of this set-back entry surface 11b form the detection regions for the wavefront acquisition, which are thus matched in terms of position and extent to the relevant shearing interferometry regions of the object and the image structure unit. In a manner analogous to this, the front entry surface 11a forms a detection plane for acquiring the Moiré image produced by superimposing the Moiré structures. In the case of the Moiré measurement, as is known, the Moiré object pattern imaged into the image plane is superimposed on the Moiré image pattern introduced into the image plane and checked for identity. Lateral deviations lead to intensity changes in the form of what are known as Moiré fringes, which can be measured with high precision by means of phase-shift techniques.

The fiber plate 11 is arranged with its front entry surface 11a in physical contact with or at a slight distance from the exit side of an image structure plate 14 which, for example, can contain an image structure according to FIG. 3. It should be noted here that, in FIG. 7 and all the other figures, the various components are reproduced in a size which is beneficial to their perception and, consequently, not necessarily to scale. This applies, for example, to the image structure plate 14, which is illustrated in FIG. 7 with an exaggerated thickness and which is located in the image plane of the imaging system to be measured, of which only the exit-side lens 1c is shown as representative in FIG. 5.

For some applications, in particular in the case of short wavelengths of the radiation used, it is expedient to provide a fluorescent layer in the region between image structure unit 14 and sensor element 12, for example on the entry side of the fiber plate 11 on its front Moiré detection plane 11a and/or on its set-back wavefront detection plane 11b. In addition to the frequency conversion, it has the effect on the Moiré entry surface 11a of destroying spatial coherence, by which means disruptive intensity effects for the Moiré measurement on account of interference, such as Talbot effects, are suppressed. For this purpose, an arrangement of a fluorescent layer close behind the image structure plate plane is beneficial.

For the guidance of the light beam of the light used for wavefront acquisition between the image structure unit 14 and the associated fiber plate entry surface 11b, that is to say in the cut-out fiber plate regions 13, there are a plurality of possibilities, of which three are shown by way of example in FIG. 7. In the example of the left-hand cutout in FIG. 7, the relevant radiation passes directly without any further influence from the image structure plate 14 to the set-back wavefront detection surface 11b. In the example of the central cutout in FIG. 7, the possibility is shown of introducing simple imaging optics (microobjective) 15 into the respective cut-out region. In the example of the right-hand cutout in FIG. 7, the possibility is shown of filling the respective cut-out region with a more highly refractive medium, for example a glass cylinder, a CaF2 material or an immersion fluid. It goes without saying that the illustration of these three examples in FIG. 7 is to be understood such that, as a rule, all the cut-out regions 13 of the fiber plate are implemented in one of these three variants and not to the effect that these three alternatives are used in a mixed manner in a respective fiber plate. The two last-named variants with microobjective and immersion fluid permit the size of the wavefront detection surface regions 11b and therefore the cross section of the cut-out regions 13 to be reduced without information loss, as can be seen immediately by using the beam course respectively shown. As a result, the packing density of the arrangement and/or the usable surface for the Moiré measurement can be increased.

Figure 8:
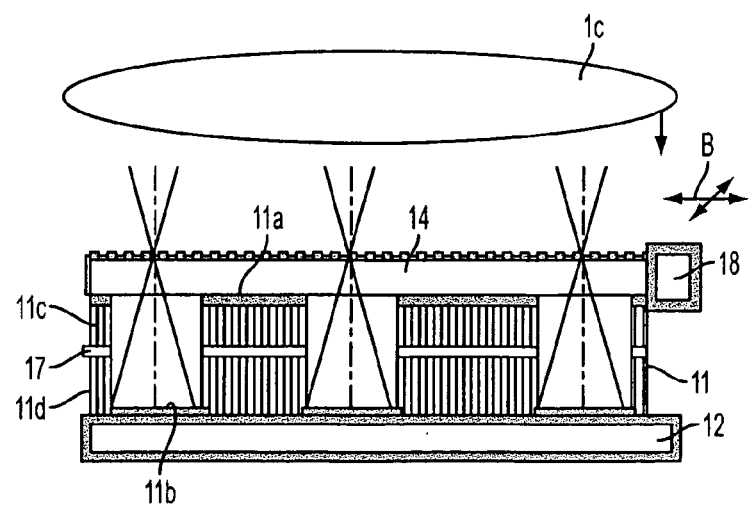
FIG. 8 shows a view corresponding to FIG. 7, but with a divided fiber plate for the lateral relative mobility of image structure unit and sensor element.

FIG. 8 shows a variant of the arrangement of FIG. 7, in which lateral relative mobility between image structure plate 14 and sensor element 12 is provided by dividing the fiber plate 11. Here, and in all the other figures, in each case the same reference symbols are used for functionally equivalent but not necessarily identical elements, for the purpose of easier understanding. Specifically, in the case of FIG. 8, the fiber plate 11 is divided into an upper half 11c and a lower half 11d, between which a slight gap 17 is formed, which permits lateral relative movement of the two fiber plate parts 11c, 11d in the plane of this gap. The air gap is typically a few microns thick, the adjacent fiber plate end surfaces are flat and polished or roughened as required. A medium with a matched refractive index, for example a fluid medium, can be introduced into the gap 17 in order to suppress reflections at the end surfaces. In addition, the end surfaces can be provided with an antireflection coating.

This exemplary embodiment is advantageous in particular when, for the purpose of phase-shifting during the measuring operations, the intention is not to move the entire arrangement but only the image structure unit 14 relative to the sensor element 12. Of course, in addition or alternatively, lateral displacement of the object structure unit, not shown here, is also possible for phase-shifting. In the example shown of FIG. 8, the image structure unit 14 can actively be moved laterally by means of a corresponding coupled actuating drive 18, as indicated by movement arrows B.

As a further modification with respect to the example of FIG. 7, the fiber plate 11 of FIG. 8 is cut out completely in its shearing interferometry regions. In this case, the surface of the sensor element 12 directly forms the effective detection plane for the wavefront acquisition. Optionally, there is a frequency-converting fluorescent layer directly on the sensor element surface.

As an alternative to the division of the fiber plate 11 shown in FIG. 8, a fiber plate that is flexible in parts can be used, which permits a lateral movement between its entry side and its exit side and therefore the desired relative mobility between the image structure unit 14 and the sensor element 12.

Figure 9:
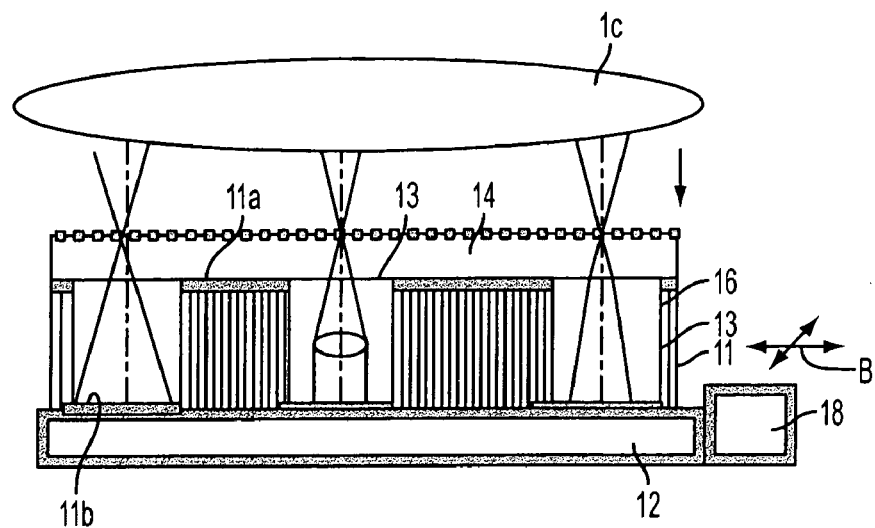
FIG. 9 shows a view corresponding to FIG. 7 but for a variant with completely cut-out shearing interferometry regions of the fiber plate.

FIG. 9 shows a further modification of the embodiments of FIGS. 7 and 8, to the effect that the lateral movement actuating drive 18 is coupled to the sensor element 12, the fiber plate 11 being undivided, as in the example of FIG. 7, and being cut out completely in the shearing interferometry regions, as in the example of FIG. 8, so that there the sensor element surface serves as an effective detection surface for wavefront acquisition.

In all the exemplary embodiments, provision can be made if required to fix the image structure unit 14 and the fiber plate 11 to each other or to arrange them such that they can be moved laterally relative to each other and, likewise, to fix the sensor element 12 firmly to the exit side of the fiber plate 11 or to arrange it such that it can be moved laterally relative to the latter. All the detector arrangements shown and described are also suitable for use in stepper/scanner systems and can be employed to determine and, if appropriate, control the aberrations of an objective there.

Figure 10:
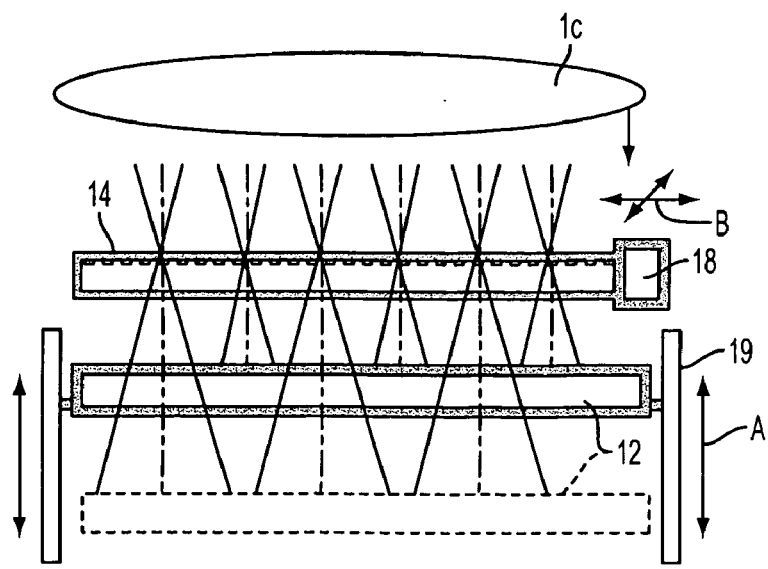
FIG. 10 shows a view corresponding to FIG. 7 but with an axially relatively movable arrangement of image structure unit and sensor element without fiber plate.

FIG. 10 shows a further modified detector unit, in which the image structure unit 14 is assigned to the lateral movement actuating drive 18 and, in addition, the sensor element 12 is arranged such that it can be moved axially along a displacement direction 19, as symbolized by a movement arrow A. Since, with a given numerical aperture, the pupil size is given by the distance, in the case of a multi-channel detector design, the pupil distance and therefore the grid of the field scanning is limited, since the individual pupils must not overlap. In specific cases, for example if only a measurement of aberrations of low order is intended, such as the focus and, simpler, as astigmatism, a lower pupil resolution is sufficient. In this case, the distance of the sensor element 12 can be reduced, as a result of which the pupil size decreases and the number of possible measurement channels and therefore the grid density increases. If the pupil size is halved, the number of measurement channels can be increased by the factor four. This is advantageous, for example, for measuring the image shell (surface of the best focus in the image field, field distribution of the Zernike coefficient Z4). For this purpose, the detector unit of FIG. 10 is useful. Continuous lines show the sensor element 12 in a position with a smaller detector spacing, dashed lines indicate it in a position with a larger detector spacing. Furthermore, this sensor element 12 is suitable for the apparatus variant mentioned above, in which at least one structure region is used both for the Moiré measurement with scanning in the image plane and for the wavefront measurement with scanning axially behind the image plane.

The displacement device 19 can, for example, be implemented by using three supporting pillars, in such a way that, in addition to the axial spacing, desired tilting of the sensor element 12 can also be set. As an alternative to the shown example of FIG. 10, provision can be made to assign the displacement device 19 to the image structure unit 14 instead of to the sensor element 12.

Figure 11:
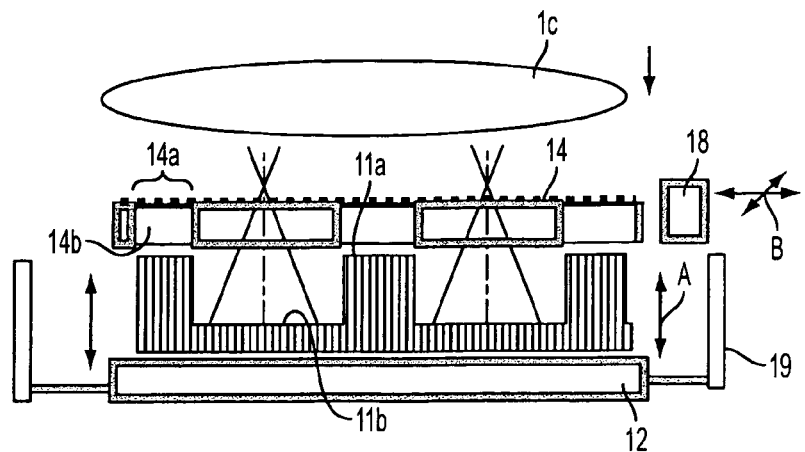
FIG. 11 shows a view corresponding to FIG. 10 but for a detector unit with an axially movable two-plane fiber plate.

In a further variant of the detector unit according to the invention for use in the measuring apparatus according to the invention with combined Moiré and wavefront measurement, the displacement device 19 according to FIG. 11 is designed for two-stage axial displacement and coupled to the sensor element 12, on which the fiber plate 11 rests, which here is again configured as a two-plane fiber plate with front Moiré entry surface 11a and set-back shearing interferometry entry surface 11b. In a first position, shown, the fiber plate 11 maintains an axial spacing from the image structure plate 14, which can thus freely be moved laterally with respect to the sensor element 12. This is advantageous for wavefront measurement. In order to effect the lateral movement, again the associated actuating drive 18 is coupled to the image structure plate 14. From this first position, the sensor element 12 together with the fiber plate 11 can be moved axially upward by the displacement device 19 into a second position, until the fiber plate 11 is resting with its Moiré entry surface 11a against the image structure plate 14. This is advantageous for the precise registration of the Moiré image in the plane of the image structure plate 14. As indicated in FIG. 11, the image structure plate 14 is optionally provided in its Moiré structure regions with rear cutouts 14b, which the projecting Moiré fiber plate regions can penetrate. In cross section, the cutouts 14b can be executed, for example, in the manner of a honeycomb, in order to ensure the greatest possible dimensional stability of the image structure plate 14.

The above-described different detector implementations are suitable, as mentioned, in particular for use in the measuring apparatus according to the invention, in that they provide two axially offset detection planes and/or an axially movable detection plane for Moiré measurement and wavefront acquisition. To this end, their detection structure, for example implemented by means of a fiber plate or alternatively also by means of a flexible image conductor bundle, is matched to the position and size of the Moiré and shearing interferometry structures used in the object and image structure units. Furthermore, further advantageous detector implementations according to the invention are possible for a measuring apparatus of this type but also for other applications, which will be discussed below.

Figure 12:
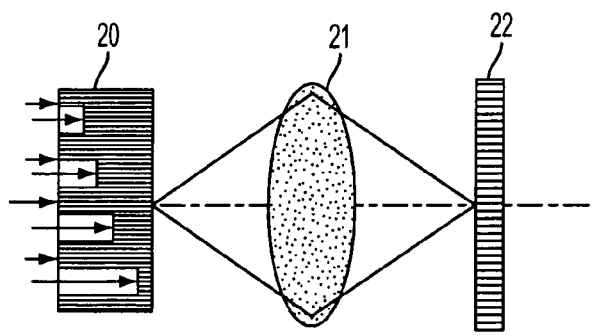
FIG. 12 shows a schematic side view of a detector unit with depth-structured fiber plate and imaging optics between fiber plate and sensor element.
Figure 13:
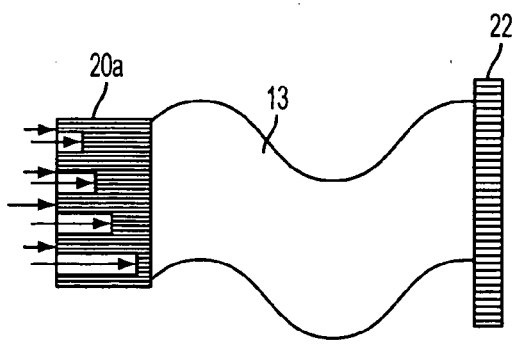
FIG. 13 shows a schematic side view of a detector unit with depth-structured fiber plate and flexible image conductor between fiber plate and sensor element.

FIG. 12 shows a detector unit with a depth-structured fiber plate 20 on the entry side, into which cutouts of different depths are introduced from the entry side. The exit side of the fiber plate 20 is imaged onto the detector plane of a sensor element 22 by means of imaging optics 21. FIG. 13 shows a similar example, in which a flexible image conductor 23 is coupled to the exit side of a depth-structured fiber plate 20a and transmits the emergent radiation to the detection plane of the sensor element 22. In a further alternative, the fiber plate of the example of FIG. 13 is replaced by a region on the entry side of the flexible image conductor 13, which is then provided with appropriate depth structuring. The detector units explained in conjunction with FIGS. 12 and 13 are particularly suitable for applications in which the sensor element 22 is intended to be at a greater distance from the system part in front of the fiber plate or the flexible image conductor and/or the waste heat from the detector unit is disruptive. For example, the fiber plate or the image conductor can be located within an evacuated measurement chamber, while the sensor element can be arranged outside the vacuum chamber.

As an alternative to the separate implementation of image structure plate 14 and fiber plate 11, shown in the above examples, a fiber plate can be provided on which the Moiré and shearing interferometry image structures are formed on the entry side and which, consequently, contains these two functionalities integrated in one component. As a further alternative to the examples shown, the fluorescent layer can be applied to the image structure plate instead of to the fiber plate. Instead of a fluorescent layer, if required a diffusor structure can be provided, for example by roughening the relevant surface. As a result, the light acceptance angle of the individual fibers of the fiber plate can be increased. An ideally isotropically emitting diffusor ensures that light also gets into the fiber from larger spatial angles. Various fluorescent media can be used for the fluorescent layer. They act in each case as a frequency converter with isotropic emission at all spatial angles. The media can be liquid or, for example, as a suspension dissolved in a liquid medium. The refractive index of liquid fluorescent media can be matched to their surroundings or can be used specifically as an immersion fluid with a relatively high refractive index. Solid fluorescent media can be used as a monolith, as granules, as an inclusion in a solid composite or as a result of doping transparent media, such as glass, quartz or crystals. Furthermore, gaseous fluorescent media enclosed in a cavity, for example as a plasma, can be used.

Figure 14:
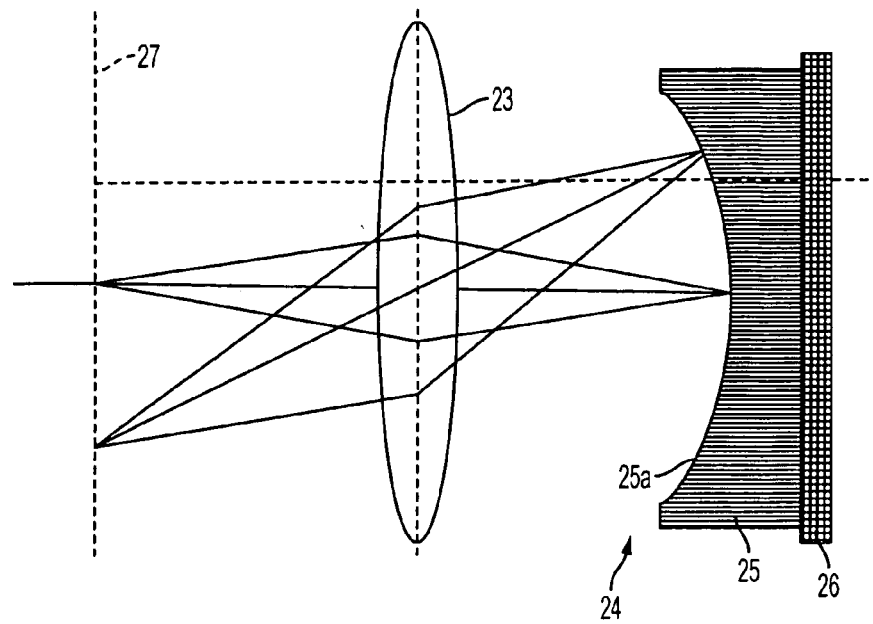
FIG. 14 shows a schematic side view of the use of a fiber plate detector unit with a curved entry surface adapted to imaging optics connected upstream to compensate for image field curvature.
Figure 15:
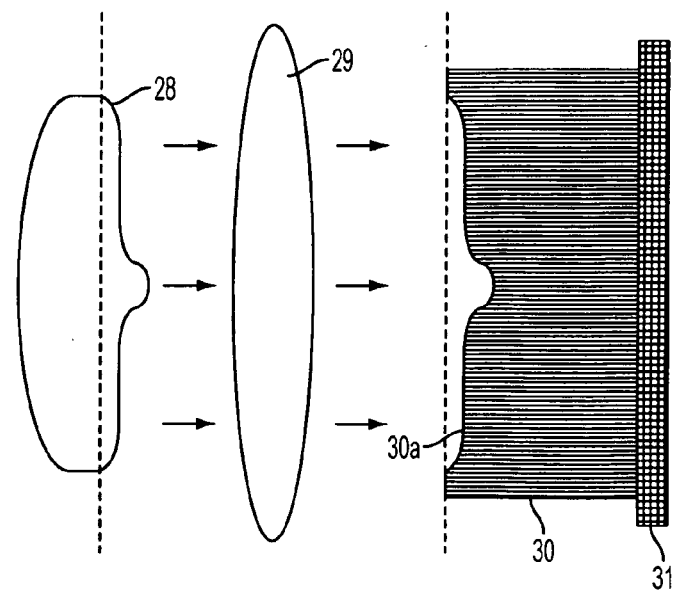
FIG. 15 shows a schematic side view corresponding to FIG. 14 but for a detector variant with a complex curvature of the fiber plate entry surface.
Figure 16:
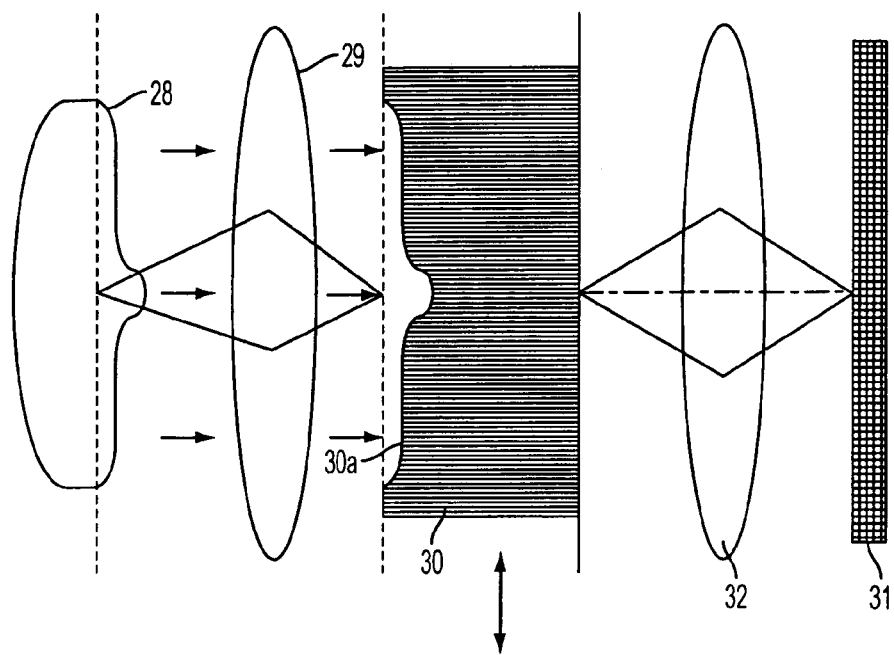
FIG. 16 shows a schematic side view corresponding to FIG. 15 but for an application with imaging optics introduced between fiber plate and sensor element.

FIGS. 14 to 16 illustrate examples of detector units with a curved fiber plate entry side as a detection surface. Detector units of this kind are useful, in particular, to compensate for the focal deviations in the image field of the optical system part connected upstream.

Specifically, FIG. 14 shows the simple case of what is known as image field curvature as a substantially spherical image field curvature of imaging optics not corrected in this regard, represented schematically by an imaging lens 23. Dispensing with the correction of the image field curvature by means of measures on the imaging optics 23 permits a considerably simpler construction of the same. These image errors of the imaging optics 23 are then compensated for by a detection unit 24 connected downstream by a fiber plate 25 being formed with an appropriately curved course on its entry surface 25a. The planar exit surface of the fiber plate 25 is in turn followed by a spatially resolving sensor element, for example a CCD array of a camera. As a result, an object 27 to be imaged, represented in FIG. 14 by a grid structure, is imaged onto the sensor element 26 without image field curvature errors, in spite of a lack to this extent of correction of the imaging optics 23 themselves. Depending on the type and configuration of the imaging optics, different curvatures of the fiber plate entry surface 25a are possible, both concave and also convex curvatures and, in addition to spherical curvatures, also in particular aspherical curvatures, such as conical, paraboloidal, ellipsoidal and other rotationally symmetrical curvatures, but also non-rotationally symmetrical curvatures, such as astigmatic saddle surfaces with two different radii of curvature and any desired free-form surfaces.

In order to name one use by way of example, for instance in the case of interferometric surface measurement, it must be ensured that the test specimen surface is imaged onto the detector free of distortion. Otherwise, surface errors will be wrongly assigned to the test specimen, and measurement errors can arise, in which the surface is possibly corrected by the right amount but at the wrong positions. Typically, the interferometers are designed such that a plane of the test specimen is imaged into the plane of the detector without any adaptation of this imaging to the individual shape of the test specimen being possible. In the case of highly curved test specimens and, in particular, in the case of aspherical optical elements, this type of focusing is consequently only a compromise, for example focusing is often carried out at the edge of an optical lens. The distortion is normally corrected by computation, to the extent to which the resolution of the detector permits this. As an alternative to this, according to the invention, it can be eliminated by a detector whose topography is matched to the distortion. FIG. 15 illustrates such an example. An aspherical test specimen surface 28 is imaged by imaging optics 29 as a plane—plane image onto the entry side 30a of a fiber plate 30, which is in turn followed on the exit side by a spatially resolving sensor element 31. The fiber plate 30 has a matched, aspherically curved entry surface 30a, which compensates for distortions arising from the aspherical surface of the test specimen 28.

FIG. 16 shows a variant of the example of FIG. 15, in which the sensor element 31 does not directly follow the fiber plate 30 but further imaging optics 32 are interposed. This makes it easier to replace the fiber plate 30, so that fiber plates with differently curved entry surfaces can very easily be used.

Figure 17:
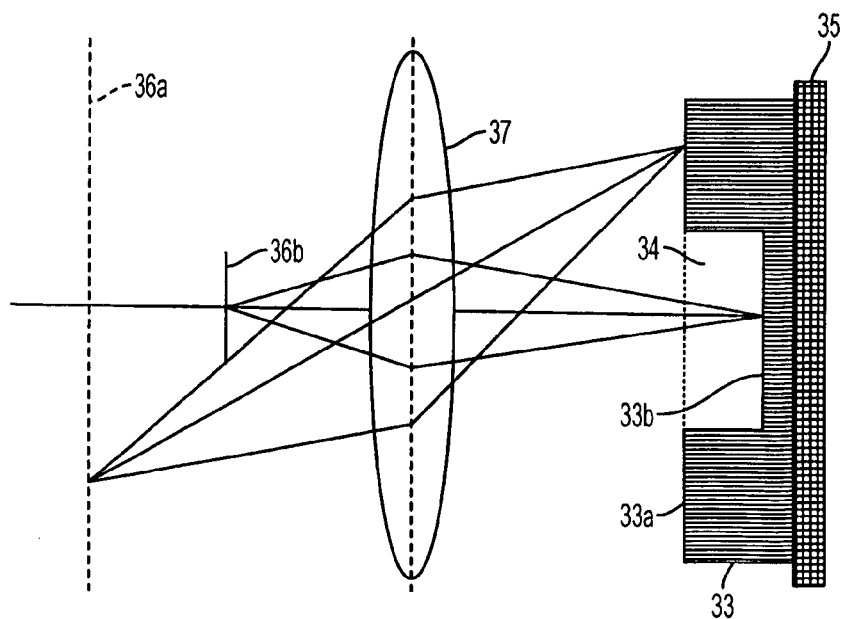
FIG. 17 shows a schematic side view of a detector unit with two-plane fiber plate in an application for imaging laterally offset objects at various distances.

FIG. 17 illustrates an application of a detector unit with a two-plane fiber plate 33 having a first, front entry surface 33a and a second, set-back entry surface 33b, which is implemented by regions 34 cut out on the entry side. On the exit side, a spatially resolving sensor element 35 follows immediately. Such multi-plane detectors are suitable, for example, for measurement purposes in which a plurality of focal planes are needed for various parts of the object field. In the shown example of FIG. 17, two laterally offset objects 36a, 36b are to be imaged sharply simultaneously by imaging optics 37, the distances being greater than the depth of focus of the imaging optics. This is done by using the detector unit by the more remote object 36a being imaged sharply onto the front entry surface 33a and the nearer object 36b being imaged sharply onto the set-back entry surface 33b. Detectors of this two-plane type are additionally suitable, as described extensively above, for use in the combined measuring apparatus according to the invention, in order to record the Moiré images at a short distance through the front entry surface of the fiber plate and to effect the wavefront acquisition at a greater distance through the axially rearwardly offset entry surface of the fiber plate.

Figure 18:
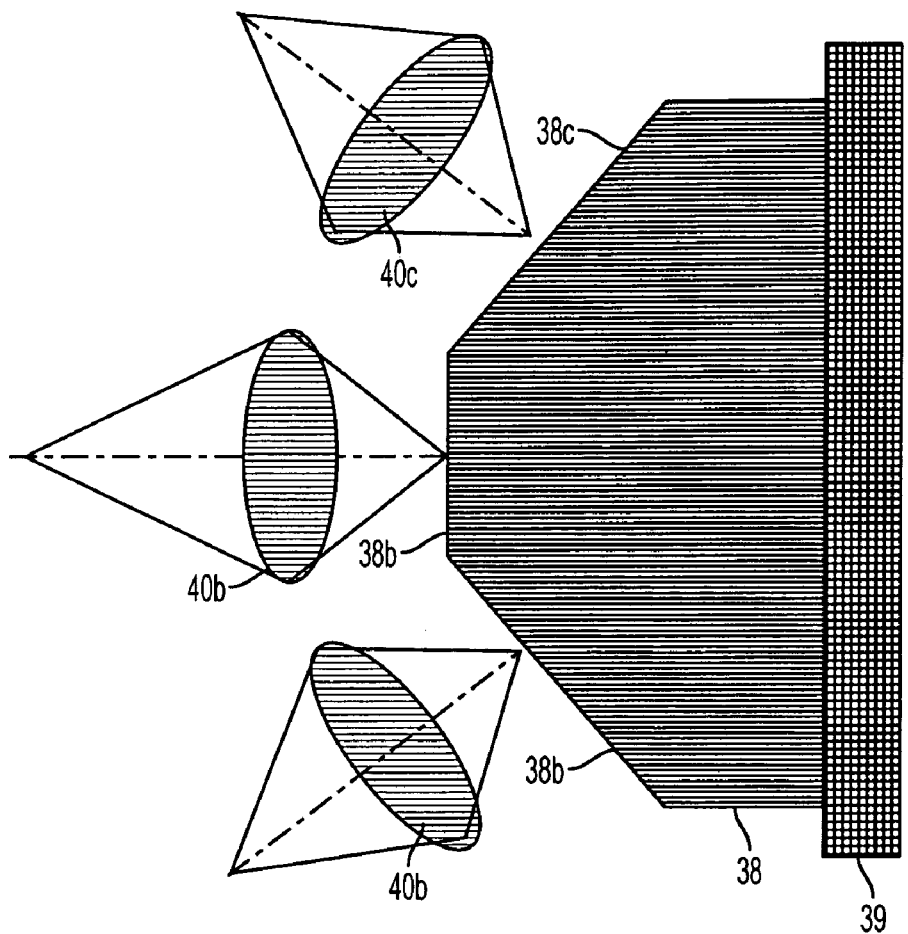
FIG. 18 shows a schematic side view of a detector unit with a fiber plate which has a plurality of entry surfaces for different spatial directions.

In a further detector unit according to the invention, as illustrated in FIG. 18, a fiber plate 38 is provided which, on the entry side, has a plurality of entry surfaces 38a, 38b, 38c which are inclined with respect to one another. On the exit side, a spatially resolving sensor element 39 again follows the fiber plate 38. The three entry surfaces 38a to 38c which can be seen in FIG. 18 permit the acquisition of an image from three correspondingly different spatial directions, with which, for example, in each case imaging optics 40a, 40b, 40c are associated, whose optical axis is parallel to the normal direction of the relevant entry surface 38a to 38c. As alternative to the entry surface configurations shown, any other designed configurations with a plurality of mutually adjacent entry surfaces tilted spatially with respect to one another are possible, such as pyramidal entry surface arrangements and the like.

Referring once more to the measuring apparatus according to the invention, a further advantageous implementation will be explained below in conjunction with FIG. 19, in which Moiré structures are additionally used for monitoring the phase-shifting steps during wavefront measurement by means of shearing interferometry. In order to calculate the phase distribution of the wavefront, as is known a plurality of interferograms have to be recorded, which differ by phase differences which are constant over the entire interferogram and which are effected by appropriate phase-shifting steps. In the BIF application and also other interferometer arrangements with diffraction gratings, the phase-shifting steps are produced by means of a lateral offset of the grating. In order to calculate the phase values, precise knowledge of these lateral displacement increments is necessary. Normally, one or more grating periods are moved over in equidistant steps.

The exact positioning and monitoring or control of the phase-shifting steps is an important factor for the achievable measurement accuracy. Depending on the application, the displacement increments have to be complied with accurately down to a few nanometers. For this purpose, precision mechanisms in conjunction with highly accurate measurement and drive systems are employed, such as drives with capacitive distance sensors. The distance measurement is normally carried out by means of distance measurement between moving and fixed component. In some cases, however, the components themselves are deformed resiliently in the nanometer range by the actuating forces introduced, which can lead to measurement errors of this order of magnitude when registering the lateral displacement of the diffraction grating.

A relative movement of object structure unit and image structure unit can occur as a further error source, for example on account of position drift phenomena or vibration of the entire structure. For example, in the case of a spacing of object to image in the range of a meter and more, even extremely small temperature changes or compressed-air changes of air bearings that are used are sufficient to cause position fluctuations in the nanometer to micron range.

In order to achieve an improvement here, it is desirable to register the lateral relative movement of object structure unit and image structure unit directly. For this purpose, as part of an operating method according to the invention for the measuring apparatus according to the invention, a direct path length measurement using Moiré structures can be provided. For this purpose, the Moiré structures provided for the distortion measurement are used, or additional Moiré grid structures with a preferably relatively small grid period are arranged on the same substrate, that is to say on the object and the image structure units. Since the structures involved on the object and image side are respectively located on the same substrate, relative movements between object structure unit and image structure unit can be detected directly by evaluating the superimposing Moiré structures.

The distance measured values obtained by such a Moiré image evaluation can be fed to a position control loop as feedback for the purpose of increasing the precision of the phase-shifting steps. Alternatively, these measured values can be acquired for each phase-shifting step and taken into account as correction values during the phase calculation. This Moiré-based monitoring of the phase-shifting steps reduces the otherwise possibly very high requirements on translators, regulation and mechanics of an associated positioning system. Positioning errors of the phase-setter and hysteresis effects are therefore comparatively uncritical. Reducing the precision requirements on the positioning system widens the freedom for constructive implementations of the same.

Figure 19:
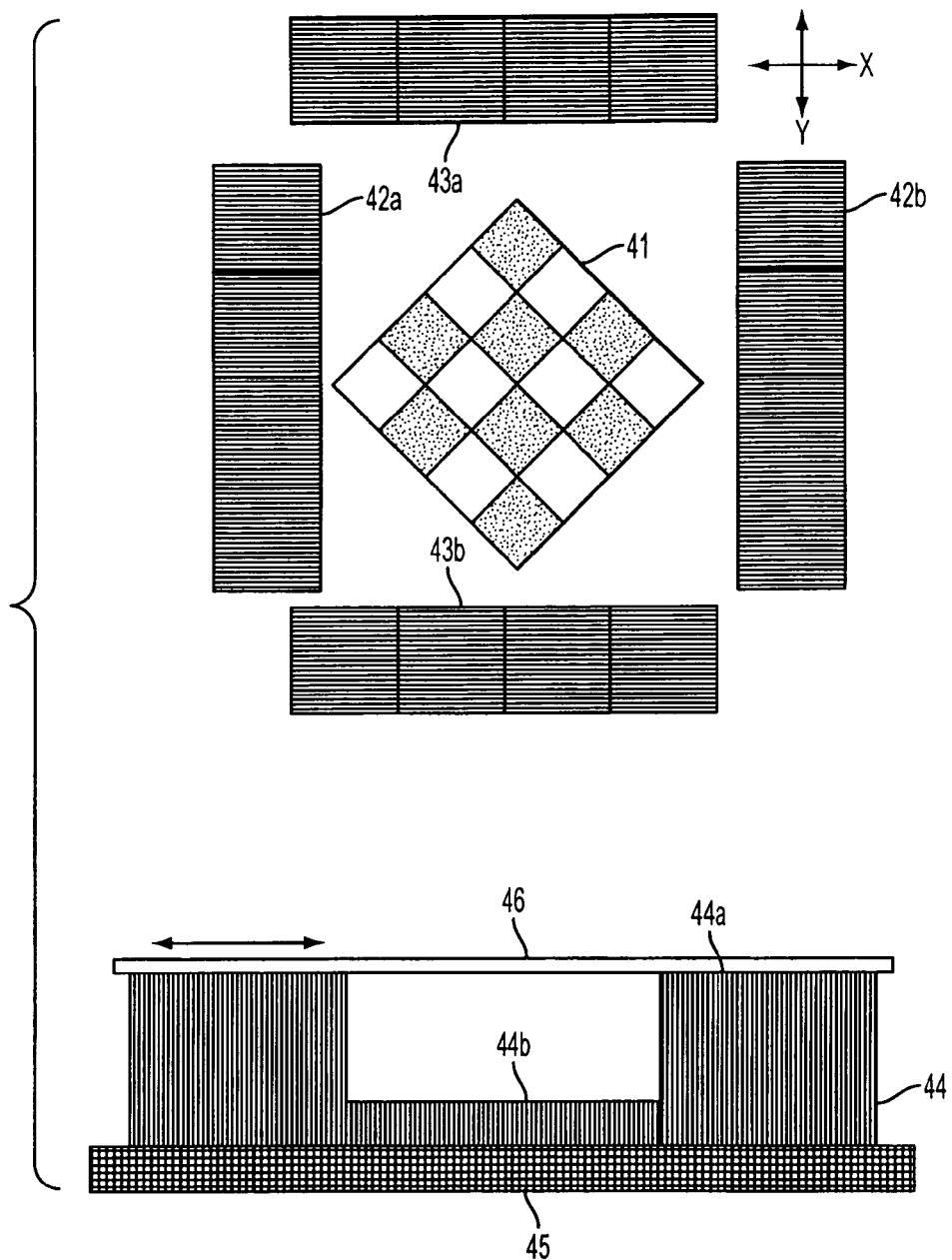
FIG. 19 shows, in the upper part of the figure, a grid structure unit for a measuring apparatus according to the invention with Moiré-controlled phase shifting and, in the lower part of the figure, an associated detector unit.

FIG. 19 shows a design of the object structure and the corresponding image structure, and also an associated detector unit, which is suitable for carrying out of this aspect of an operating method according to the invention for the measuring apparatus according to the invention. Specifically, in the upper part of the figure, a plan view of an object structure unit suitable for this purpose and an image structure unit corresponding to this with appropriate scaling are illustrated. This object and image structure unit contains a checkerboard or diamond pattern 41 in a central region, which serves on the object side as a coherence mask and on the image side as a diffraction grating of the shearing interferometer for the wavefront measurement. Provided in the peripheral region, opposite each other in the X and Y directions, are in each case a pair of Moiré line grids 42a, 42b and 43a, 43b. The Moiré line grids 42a, 42b opposite each other in the X direction are rotated through 90° with respect to the Moiré line grids 43a, 43b opposite each other in the Y direction. Each of the four Moiré line grids 42a, 42b, 43a, 43b comprises four individual fields lying beside one another, alternatively they can comprise any other desired number of individual fields or can be implemented as a stripe structure.

In a design as a stripe structure, by detuning the grid frequencies of the object grid structure, on the one hand, and image grid structure, on the other hand, a beat frequency can be produced in the superimposed pattern, the low-frequency Moiré pattern then being resolved by the detector unit as a periodic light-dark modulation at right angles to the grid lines. If, for example, a first grid with 1000 lines/mm is superimposed on a second grid with 900 lines/mm, the result is a Moiré beat pattern with a sinusoidal intensity course and a period of 0.1 mm. In the event of relative movement of the two grids, the phase of this pattern is displaced, specifically by one period with an offset of 0.1 mm in each case. In order to calculate the phase angle, with a known periodicity, in theory three measured points with a known phase difference are sufficient. The stability and accuracy of the measurement may be increased, however, by using methods with more than three phase steps. In each case, it is possible with this arrangement to calculate the phase angle of the Moiré pattern from one detector recording.

Instead of detuned grid frequencies of the object and image grids, it is also possible to use grids which contain individual fields with fixed phase differences. In this case, object and image grid structure with the same grid frequency are superimposed, and the phase steps are written into the pattern of one of the grid pairs respectively. If the phase steps are known, the phase can be calculated in a conventional manner. In practice, phase resolutions of $\frac{1}{200}$ to $\frac{1}{1000}$ of the grid period can be achieved without difficulty, even still higher resolutions with greater effort. In the case of a grid period of 1 µm, this means a resolution of up to 1 nm or better. For the application in shearing interferometry with typical grid periods of 10 µm, this results in a setting uncertainty of the phase steps of only 0.01%. The pair-wise arrangement of Moiré line grids shown in the example of FIG. 19 additionally permits the acquisition of (rotational) angle errors and crosstalk effects of the movement axes during the phase shifting. In addition, by using the modulation depth of the Moiré fringes, that is to say via the Moiré contrast, a change in the focal plane (as an equal component of the contrast change in all four individual fields) or tilting (as a difference in the contrast change in the individual fields) and, consequently, undesired grid movement in the Z direction can be detected. The functionalities mentioned can also be used in combination, so that a highly accurate, unambiguous determination of position can be achieved by means of these Moiré structures over a large measurement range.

The detector unit shown schematically in the lower part of FIG. 19 corresponds to the abovementioned detector type with a two-plane fiber plate 44, whose planar exit surface is followed by a spatially resolving sensor element 45 and which, on the entry side, has a front entry surface 44a for registering the Moiré image and an entry surface 44b set back in relation thereto for the wavefront acquisition of the shearing interferometry. Above the fiber plate 44 there is the image structure unit 46 which is provided with the associated image structure and which can be displaced laterally with respect to the corresponding object structure unit.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. An apparatus for measuring an optical imaging system, which comprises:
    an arrangement for combined wavefront and distortion measurement, comprising
    an object structure with an interferometry object structure for wavefront generation from illuminating light and a Moiré object structure for Moiré pattern generation, which are to be arranged simultaneously or alternatively on the object side, and
    an image structure with an interferometry image structure matched to the interferometry object structure and a Moiré image structure matched to the Moiré object structure, which are to be arranged simultaneously or alternatively on the image side,
    a spatially resolving detector unit which is arranged downstream of the image structure and has a first detector plane for the spatially resolving acquisition of interferometry wavefront information, and a second detector plane for the spatially resolving acquisition of Moiré image information for distortion measurement, or has an axially movable detector surface for the spatially resolving acquisition of interferometry wavefront information in a first axial position and for the spatially resolving acquisition of Moiré image information for distortion measurement in a second axial position.

2. The apparatus as claimed in claim 1, wherein at least one of the object structure and the image structure contains a plurality structure regions selected from the group consisting of line-grid, cross-grid, checkerboard-grid and pinhole structure regions, which are used as at least one of shearing interferometry and point-diffraction interferometry structures for at least one of wavefront/image-shell measurement and as Moiré structures for distortion measurement.

3. The apparatus as claimed in claim 1, wherein at least one of the object structure and the image structure contains at least one of at least two different interferometry and at least two different Moiré structure regions with different structure periodicity.

4. The apparatus as claimed in claim 2, wherein at least one illumination focusing optics and a diffusion plate region are assigned to at least one of a respective interferometry structure region and a respective Moiré structure region.

5. The apparatus as claimed in claim 3, wherein at least one illumination focusing optics and a diffusion plate region are assigned to at least one of a respective interferometry structure region and a respective Moiré structure region.

6. The apparatus as claimed in claim 1, wherein at least one of the image structure and a spatially resolving sensor element of the detector unit is arranged to move axially relative to one another.

7. The apparatus as claimed in claim 1, wherein the image structure, as a separate component, is fixed on the entry side of the detector unit or is held such that it can move with respect to the detector unit or forms an integral part on the entry side of the detector unit.

8. The apparatus as claimed in claim 1, wherein the detector unit comprises:
   at least one of a fiber plate and a flexible image conductor; and
   a spatially resolving sensor element arranged downstream of the fiber plate or the flexible image conductor, wherein
   the fiber plate or the flexible image conductor has a curved entry surface or at least two different entry surfaces, which are offset axially or inclined spatially with respect to one another, or an entry surface which is configured to move into at least two different axial positions.

9. A method for measuring an optical imaging system, comprising:
   performing a combined wavefront and distortion measurement, in which
      an interferometry object structure for wavefront generation from illuminating light and a Moiré object structure for Moiré pattern generation are arranged simultaneously or alternatively on the object side,
      an interferometry image structure matched to the interferometry object structure and a Moiré image structure matched to the Moiré object structure are arranged simultaneously or alternatively on the image side, and
   using a first detector plane, interferometry wavefront information is acquired in a spatially resolving manner and, using a second detector plane, Moiré image information is acquired in a spatially resolving manner for distortion measurement, or the interferometry wavefront information and the Moiré image information for distortion measurement are acquired one after another in a spatially resolving manner with a detector surface which can be moved into two different axial positions.

10. The method as claimed in claim 9, further comprising performing at least one of a topographic calibration for at least one of the object structure and the image structure, wherein a wavefront is acquired in an undisplaced initial position of object structure and image structure and a wavefront is acquired in one or more positions of object structure or image structure which are displaced laterally with respect to the initial position, the difference between the measured values for the one or more displaced positions and the measured values for the undisplaced position is formed and, from this, the topography profile of the object structure or image structure is determined.

11. The method as claimed in claim 9, wherein a lateral relative movement between object structure and image structure for phase-shift steps during a wavefront acquisition procedure is acquired by means of interferometry by evaluating a superposition of an imaged Moiré object structure and a Moiré image structure.

12. The method as claimed in claim 11, wherein the lateral displacement values determined by Moiré evaluation are used as correction values during the determination of the phase from the wavefront acquisition measured values or as feedback values for an associated positioning system.

13. The method as claimed in claim 9, wherein at least one structure region of at least one of the object structure and of the image structure is used both as an interferometry structure region and as a Moiré structure region and an interferometry image of the structure region, on the one hand, and a Moiré image of the structure region, on the other hand, are acquired by means of a detector surface moved axially into two different positions.

14. The method as claimed in claim 9, wherein, in the object structure and in the image structure, respectively, at least one point diffraction interferometry structure region is provided and the relative axial position of object structure and image structure is acquired from the associated point diffraction interferometry image.

\* \* \* \* \*